(12) United States Patent
Harvey

(10) Patent No.: US 11,739,278 B2
(45) Date of Patent: Aug. 29, 2023

(54) BEARING MATERIAL, BEARING AND METHOD FOR ITS MANUFACTURE

(71) Applicants: Mahle International GmbH, Stuttgart (DE); Mahle Engine Systems UK Ltd, Rugby (GB)

(72) Inventor: Jennifer Harvey, Bedworth (GB)

(73) Assignee: Mahle International GmbH

( * ) Notice: Subject to any disclaimer, the term of this patent is extended or adjusted under 35 U.S.C. 154(b) by 4 days.

(21) Appl. No.: 17/288,510

(22) PCT Filed: Oct. 24, 2019

(86) PCT No.: PCT/EP2019/079097
§ 371 (c)(1),
(2) Date: Apr. 23, 2021

(87) PCT Pub. No.: WO2020/084086
PCT Pub. Date: Apr. 30, 2020

(65) Prior Publication Data
US 2021/0388283 A1 Dec. 16, 2021

(30) Foreign Application Priority Data
Oct. 26, 2018 (GB) .................................. 1817468

(51) Int. Cl.
*C10M 107/44* (2006.01)
*F16C 33/20* (2006.01)
(Continued)

(52) U.S. Cl.
CPC ........... *C10M 107/44* (2013.01); *C08G 73/14* (2013.01); *C08J 3/24* (2013.01); *F16C 17/02* (2013.01);
(Continued)

(58) Field of Classification Search
CPC ......... C08G 73/14; C08J 3/24; C08J 2379/08; F16C 17/02; F16C 33/201; F16C 2208/42; F16C 9/02; F16C 9/04; F16C 17/00; F16C 29/02; C10M 107/44; C10M 2217/0443; C10N 2040/02; C10N 2050/08; C08K 2003/0812; C09D 179/08
See application file for complete search history.

(56) References Cited

U.S. PATENT DOCUMENTS

| 4,766,194 A | 8/1988 | Robertson |
| 2005/0103224 A1 | 3/2005 | Tran et al. |
| 2017/0138396 A1* | 5/2017 | Latham .................. F16C 33/64 |

FOREIGN PATENT DOCUMENTS

| DE | 19948313 A1 | 4/2001 |
| DE | 102013021949 A1 | 7/2015 |
| (Continued) |

OTHER PUBLICATIONS

English abstract for JP-S60-101110.
(Continued)

*Primary Examiner* — Taiwo Oladapo
(74) *Attorney, Agent, or Firm* — Fishman Stewart PLLC

(57) ABSTRACT

A bearing material may include a polyamide-imide polymer material and a difunctional crosslinking agent comprising a hydrocarbon chain and two functional groups. The functional groups may be selected from the list: amino, acid, epoxide, thiol, isocyanate.

17 Claims, 2 Drawing Sheets

(51) Int. Cl.
*C08G 73/14* (2006.01)
*C08J 3/24* (2006.01)
*F16C 17/02* (2006.01)
*C10N 40/02* (2006.01)
*C10N 50/08* (2006.01)

(52) U.S. Cl.
CPC ......... *F16C 33/201* (2013.01); *C08J 2379/08* (2013.01); *C10M 2217/0443* (2013.01); *C10N 2040/02* (2013.01); *C10N 2050/08* (2013.01)

(56) References Cited

FOREIGN PATENT DOCUMENTS

| | | |
|---|---|---|
| DE | 102015204626 A1 | 10/2015 |
| FR | 2858166 A1 | 1/2005 |
| GB | 2521004 A | 6/2015 |
| GB | 2561907 A * | 10/2018 ............. C08G 73/14 |
| JP | S60-101110 A | 6/1985 |
| JP | 2004-31786 A | 1/2004 |
| JP | 2014-62223 A | 4/2014 |
| WO | WO-2004/113749 A1 | 12/2004 |
| WO | WO-2010/066396 A1 | 6/2010 |
| WO | WO-2017/104461 A1 | 6/2017 |
| WO | WO-2018/197304 A2 | 11/2018 |
| WO | WO-2019/052905 A1 | 3/2019 |

OTHER PUBLICATIONS

English abstract for JP-2004-31786.
English abstract for JP-2014-62223.
English abstract for DE-102013021949.
English abstract for DE-102915204626.
English abstract for FR-2858166.
English abstract for DE-19948313.

* cited by examiner

BEARING MATERIAL, BEARING AND METHOD FOR ITS MANUFACTURE

CROSS-REFERENCE TO RELATED APPLICATIONS

This application claims priority to International Patent Application No. PCT/EP2019/079097, filed on Oct. 24, 2019, and United Kingdom Patent Application No. 1817468.0, filed on Oct. 26, 2018, the contents of both of which are hereby incorporated by reference in their entirety.

TECHNICAL FIELD

The invention relates to a bearing material, a bearing or bearing element comprising the bearing material, a method for making a bearing material, and a method for manufacturing a bearing element. In particular, the invention relates to an improved plastics bearing material for use in forming a running surface or sliding surface of a sliding engine component. Bearing materials and elements embodying the present invention are particularly suitable for use as, or as part of, sliding engine components for sliding bearing assemblies such as bearing shells, bushes, bearing surfaces of crankshafts, bearing surfaces of camshafts, bearing surfaces of connecting rods, thrust washers, flanges, bearing surfaces of a bearing block, bearing surfaces of a bearing cap, and piston assembly components such as piston rings, piston skirts, and cylinder walls and cylinder liners.

BACKGROUND

Bearing elements are generally known which comprise a steel back, a substrate layer and a sliding layer (or overlay or running layer). These are commonly used in engines, such as internal combustion engines, for example as crankshaft and/or camshaft supporting bearings and big end bearings and small end bushings in connection rods. They may also be used as thrust washers (axial bearings).

Plain bearings for use as crankshaft journal bearings in internal combustion engines, for example, are usually semi-cylindrical in form and have a layered construction. This construction typically comprises; a backing made from a strong backing material such as steel, of a thickness in the region of about 1 mm or more; a lining of a first bearing material adhered to the backing and of thickness from about 0.1 to 0.5 mm; and a layer of a second bearing material adhered to the surface of the first bearing material and having a thickness of less than about 40 µm. The surface of the second bearing material forms the actual running or sliding surface with a co-operating shaft journal surface.

The backing provides strength and resistance to deformation of the bearing shell when it is installed in a main bearing housing or in a connecting-rod big end, for example.

The first bearing material layer may provide suitable bearing running properties if the layer of the second bearing material should be worn through for any reason, and prevent the journal surface from coming into contact with the strong backing material. It also bonds to the backing, and supports and bonds to the second bearing material. The first bearing material may commonly be either an aluminium-based alloy or a copper-based alloy. Copper-based alloys, such as bronzes, are typically used in more highly-loaded bearings to provide additional support for the second bearing material layer.

The second bearing material layer which co-operates with the shaft journal may also be termed an overlay, or overlay layer. Conventionally, this has been formed by a relatively soft metal layer, to provide conformability (the ability of the bearing to accommodate small misalignments between the bearing surface and the shaft journal) and embeddability (the ability to prevent debris, or dirt particles, which may circulate in the lubricating oil, from scoring or damaging the journal surface by enabling such debris to embed in the bearing surface).

More recently, bearing overlay layers comprising a matrix of plastics polymer material have been used. Examples are described in WO 2004/113749 and WO 2010/066396. Such overlay materials are commonly based on a matrix of polyamide-imide (PAI) containing various filler materials, such as hard reinforcing particles, soft particles of solid lubricant materials, and other components such as metal particles. Hard reinforcing particles may include ceramic or metal oxide particles. Solid lubricants may include materials such as graphite or molybdenum disulphide. Metal particles may include aluminium particles, such as aluminium flakes.

PAI materials have proved to be able to provide robust and effective bearing materials, including in the aggressive conditions of modern internal-combustion engines where stop-start operation, to reduce fuel consumption, requires a typical engine to undergo a greatly increased number of stop-start operations. Each time an engine restarts, full hydrodynamic lubrication may not be in place and so bearings such as crankshaft bearings need to be able to survive an increased number of non-hydrodynamically-lubricated start-up operations. PAI-coated bearings, with suitable filler materials, have proved able to provide good performance, including conformability and embeddability, but nevertheless the applicant for the present invention has found that it is advantageously possible to improve the performance of PAI bearing materials, and of bearings comprising these materials.

SUMMARY

The present invention provides a bearing material, a bearing element, a method for making a bearing material and a method for making a bearing element as defined in the appended independent claim(s), to which reference should now be made. Some preferred or advantageous embodiments of the invention are set out in dependent claim(s).

In a first aspect, there is provided a bearing material comprising a polyamide-imide (PAI) polymer material and a difunctional crosslinking agent. The difunctional crosslinking agent comprises a hydrocarbon chain and two functional groups, in which the functional groups are selected from the list: amino, acid, epoxide, thiol, isocyanate.

The polyamide-imide polymer may comprise a chain or network of alternating amine and anhydride elements such as acid anhydride elements. The amine elements of the polymer chain are derived from monomers in the form of one or more diamine(s), while the imide elements, or groups, originate from reaction of the anhydride elements with the diamines. The polyamide-imide polymer may be termed a PAI plastics polymer.

The molecules of the difunctional crosslinking agent comprise a hydrocarbon chain bonded to two functional groups. The crosslinking agent may be termed a difunctional hydrocarbon crosslinking agent. The two functional groups of the crosslinking agent advantageously allow the crosslinking agent molecules to react in two positions, so that the crosslinking agent may react and bond to two different polymer chains, forming a crosslinker between the polymer chains.

The functional groups may be attached to the terminal carbon atoms at either end of the hydrocarbon chain, so that the molecules of the crosslinking agent may react at either end.

The molecules of the difunctional crosslinking agent comprise two functional groups which are selected from the list of amino, acid, epoxide, thiol, and isocyanate functional groups.

Amino, thiol, isocyanate and epoxy functional groups are all thought to react with PAI molecules via similar reaction mechanisms, while acid functional groups are thought to react via a different mechanism.

The crosslinking agent may comprise two identical functional groups. Thus, the crosslinking agent may be a diamine, a diacid, a diepoxy, a dithiol, or a diisocyanate.

The crosslinking agent may alternatively comprise two different functional groups selected from the same list of amino, acid, epoxide, thiol, and isocyanate functional groups.

The molecules of the crosslinking agent may advantageously consist of organic elements only. That is, the crosslinking agent may consist of carbon, hydrogen, and one or more element selected from the list of: oxygen, nitrogen, sulfur, phosphorus, fluorine, chlorine, bromine, and iodine.

In a preferred embodiment, the hydrocarbon chains of the crosslinking agent may consist of hydrogen and carbon only, or they may additionally comprise one or more further organic elements. For example, although described as "hydrocarbon chains", the hydrocarbon chains of the crosslinking agent may comprise nitrogen and/or oxygen in addition to hydrogen and carbon.

The bearing material is advantageously curable to form a plastics polymer material. The difunctional hydrocarbon crosslinking agent may advantageously react with the PAI polymer molecules during the polymer curing process so that the hydrocarbon chains form crosslinkers between PAI molecules.

The inventor's experiments have demonstrated that this hydrocarbon-crosslinked PAI material may advantageously provide a bearing material that demonstrates increased oleophilicity (affinity to oil) compared to conventional PAI materials. That is, the hydrocarbon-crosslinked PAI material may exhibit improved wettability with hydrocarbon oils typically used to lubricate vehicle bearings. Thus, the modified PAI may advantageously better retain engine oil on the bearing surface than a conventional PAI bearing material, leading to increased bearing lubricity and improved bearing-material wear characteristics particularly in stop-start applications.

The inventor has found that hydrocarbon-crosslinking of the PAI bearing material may lead to advantageously improved wettability of oil on PAI-coated bearing surfaces, with the potential effect that more oil is retained on the bearing both during running and between running operations when the bearing is stationary.

The improved oleophilicity may advantageously mean that the material of the present invention exhibits both low friction and quicker establishment of hydrodynamic lubrication at lower speeds after start up.

Thus, the hydrocarbon-crosslinked-PAI bearing material of the present invention may exhibit advantageously improved oil wettability, improved wear resistance, and highly desirable low friction characteristics.

The hydrocarbon chains in the crosslinking agent may contain saturated or unsaturated hydrocarbon chains. That is, the hydrocarbon chains may contain alkyl chains containing only single carbon-carbon bonds, alkenyl chains containing one or more double bonds between carbon atoms, or alkynyl chains containing one or more triple bonds between carbon atoms.

Preferably, the hydrocarbon chains of the crosslinking agent may comprise, or consist of, aliphatic chains. Preferably more than 70%, or 80%, or 90% of the hydrocarbon chains of the difunctional crosslinking agent are aliphatic hydrocarbon chains.

The hydrocarbon chains of the crosslinking agent may include branched hydrocarbon chains and/or unbranched hydrocarbon chains. In a preferred embodiment, more than 70%, or 80%, or 90% of the hydrocarbon chains are unbranched hydrocarbon chains.

Preferably the average chain length of the hydrocarbon chains of the crosslinking agent is at least 6, or 7, or 8, or 9 carbon atoms, and/or less than or equal to 10, or 12, or 14, or 18 carbon atoms. The average chain length of the hydrocarbon groups may be between 6 and 18, or between 7 and 12, or between 8 and 10 carbon atoms.

The optimal length of hydrocarbon chain may vary depending on the functional groups in the crosslinking agent. For example, different functional groups may affect the solubility of the crosslinking agent in the solvents typically used to disperse PAI in bearing material before application and curing. One example of a suitable solvent is N-ethyl pyrrolidone (NEP).

Crosslinking agent molecules with a chain length of more than 18 carbon atoms may be insoluble in solvents typically used to disperse PAI, so may be difficult to mix satisfactorily with the bearing material. Long crosslinker molecules may also cause steric hindrance around polymer chains, and may thus be detrimental to polymer cure.

Short crosslinking agent molecules, for example with fewer than 6 carbon atoms, may form brittle crosslinkers, which may detrimentally affect the properties of the cured material.

Hydrocarbon groups with average chain lengths of between 8 and 10 carbon atoms may advantageously be soluble in the solvents typically used in PAI polymer materials prior to curing. Chain lengths of between 8 and 10 carbon atoms may advantageously increase the oleophilicity of the polymer material, without being overly detrimental to polymer cure and the strength achieved during the curing process.

In two particularly preferred embodiments, 1, 8-diamino and 1, 10-diamino crosslinking agents may be used. For example, 1, 8-diaminooctane and 1, 10-diaminodecane crosslinking agents have been found to provide bearing materials which exhibit improved properties after curing.

References to "average chain length" herein preferably conform to standard IUPAC nomenclature. Thus, the "average chain length" in this context refers to the average length of the crosslinking agent molecules' parent chains. The "average chain length" does not take into account any carbon atoms forming substituent "branch" portions of a branched hydrocarbon chain.

If the hydrocarbon chain included, for example, an ether group (R—O—R'), the chain length may be defined as the overall number of atoms (carbon plus oxygen) in the parent chain.

In a preferred embodiment, the crosslinking agent may comprise hydrocarbon chains with a chain length of eight carbon atoms. In another preferred embodiment, crosslinking agent may comprise hydrocarbon chains with a chain length of ten carbon atoms.

The PAI polymer material is made up of so-called "repeat units", which are joined to one another at either end to form polymer chains. The average number of repeat units in each polymer chain may be calculated by analysing the molecular weight of the polymer material. The degree to which the polymer material may be functionalised, for example by a crosslinker molecule, may be quantified by assessing the number of potentially functionalisable sites on an average polymer chain. In order to quantify the expected extent to which PAI polymer chains will react with crosslinking agent molecules on curing, the relative proportions of these ingredients may be assessed by comparing the number of potentially functionalisable sites on an average polymer chain to the number of crosslinking agent molecules available for reaction. This proportion may be expressed as a molar ratio of crosslinking agent molecules to functionalisable sites on a polymer molecule, or (as the number of functionalisable sites per repeat unit is known) as a molar ratio of crosslinking agent molecules to repeat units in a polymer molecule.

On average, each repeat unit of a non-modified PAI polymer chain may be considered to have one or more functionalisable reaction sites which may bond with a crosslinking agent.

In a preferred embodiment of the bearing material, the molar ratio of crosslinking agent to the functionalisable reaction sites in the polymer material is between 0.1 and 0.25, and preferably between 0.15 and 0.2. In other words, the crosslinking agent is preferably present in the un-cured bearing material in a quantity of between 10 mol % (ratio of 0.1) and 25 mol % (ratio of 0.25) with respect to the total number of functionalisable reaction sites in the PAI polymer material.

Due to the limited number of functionalisable sites on the polymer chains, the curing process undergone by the polymer bearing material is a competitive reaction between internal imidization and crosslinking. The inventor has found that more than 10 mol % crosslinking agent (relative to the total number of functionalisable reaction sites in the PAI material) may advantageously lead to more crosslinking than is normally obtained in conventional PAI bearing material. Above 25 mol % crosslinking agent:functionalisable sites, however, the increased crosslinking may result in more brittle, less flexible coatings, with decreased conformability.

As the average length and composition of the polymer chains can be calculated, it is possible to calculate the number of sites on each polymer chain that are potentially functionalisable with a crosslinker. The number of functionalisable sites will depend both on the polymer itself and the composition of the crosslinking agent. For example, where the crosslinking agent is an amine (or diamine), it is expected that amines will only functionalise acid or carbonyl groups on the polymer chain itself. Thus, the average number of acid and/or carbonyl groups on each polymer chain may be calculated to be the number of potential reaction sites that are functionalisable with an amine crosslinking agent. Likewise, where the crosslinking agent is an acid (or diacid), acids are expected to only functionalise amine groups on the polymer chain itself. The total number of amine groups on each polymer chain therefore gives the number of potential reaction sites that are functionalisable with an acid crosslinking agent. Hydrocarbons with epoxide, thiol or isocyanate functional groups may also functionalise acid or amine functional groups on the polymer itself.

The number of crosslinking agent molecules, and the number of functionalisable reaction sites, on a polymer molecule may be converted into a ratio to give an indication of the proportion to which the polymer material will be crosslinked after curing.

Preferably the molar ratio of crosslinking agent molecules:functionalisable sites on an average PAI molecule is between 0.1 and 0.25. In other words, the crosslinking agent molecules are preferably present in a quantity of between 10 mol % (ratio of 0.1) and 25 mol % (ratio of 0.25) with respect to the number of potentially functionalisable sites in the molecules of the PAI polymer material.

According to this definition, a theoretical ratio of 0.25:1 would correspond to one crosslinking agent molecule to four functionalisable sites of a PAI polymer molecule. As each crosslinking agent molecule is difunctional, however, when the bearing material is cured the same hydrocarbon chain bonds to two functionalisable sites, preferably on two PAI polymer chains. This is due to both functional groups of the crosslinking agent reacting and bonding to a functionalisable site on a PAI molecule. Thus, if the pre-curing bearing material has a crosslinking agent to PAI molecules ratio of 0.25:1, after curing, 50% of the functionalisable sites of the PAI molecules will bond to a hydrocarbon crosslinker on curing. The cured 0.25:1 material is therefore 50% crosslinked.

Thus, for example, a ratio of 0.1 would correspond to one difunctional crosslinking agent molecule for every 10 functionalisable sites on the un-cured PAI. On curing, however, the two functional groups of the crosslinking agent both react to bond to a functionalisable site on the PAI. So in the cured material two in every 10 functionlisable sites are bonded to a hydrocarbon chain. The cured 0.1:1 material is therefore 20% crosslinked.

The molar ratio of crosslinking agent to potentially functionalisable sites may be between 0.15 and 0.2. In other words, the hydrocarbon groups are preferably present in a quantity of between 15 mol % (ratio of 0.15) and 20 mol % (ratio of 0.2) with respect to the number of potentially functionalisable sites in the molecules of the PAI polymer material.

In a polymer material with a ratio of 0.15 crosslinking agent molecules to functionalisable sites of the polymer, 30% of the functionalisable sites in the polymer bond to a hydrocarbon chain during the curing process. Each hydrocarbon chain is expected to bond to two functionalisable sites, on two separate PAI molecules, so that the hydrocarbon chain forms a crosslinker between the PAI molecules. The cured 0.15:1 material is therefore 30% crosslinked.

If the molar ratio of crosslinking agent to the functionalisable reaction sites in the polymer material is 0.2 in the un-cured bearing material, this is equivalent to 40% of the functionalisable reaction sites on the polymer chains being functionalised with a hydrocarbon chain crosslinker after curing. If the molar ratio of crosslinking agent to the functionalisable reaction sites in the polymer material is 0.15, this is equivalent to 30% of the functionalisable reactive sites on the polymer chains being functionalised with a hydrocarbon chain crosslinker after curing, and so on.

In preferred embodiments of the invention, a first functional group of the crosslinking agent is an amino functional group, and a second functional group of the crosslinking agent is selected from the list of: amino, acid, epoxide, thiol, isocyanate functional groups.

According to a second aspect of the invention, there is provided a bearing element in which a bearing surface layer comprises a polyamide-imide polymer material with hydrocarbon crosslinkers between polymer molecules.

In the second aspect of the invention, a bearing material embodying the first aspect of the invention may be incorporated into a bearing or bearing element. The second aspect of the invention may thus provide a bearing element in which a bearing surface layer is formed by curing the bearing material according to the first aspect of the invention.

The bearing surface layer may be termed an overlay, or a polymer-overlay.

The bearing element may alternatively be termed a sliding engine component. Bearing elements according to the present invention may be components for sliding bearing assemblies such as bearing shells, bushes, bearing surfaces of crankshafts, bearing surfaces of camshafts, bearing surfaces of connecting rods, thrust washers, flanges, bearing surfaces of a bearing block, bearing surfaces of a bearing cap, and piston assembly components such as piston rings, piston skirts, and cylinder walls and cylinder liners.

The hydrocarbon crosslinkers may be the residues, or reaction products, obtained from a reaction between a difunctional crosslinking agent comprising a hydrocarbon chain with two functional groups, and two PAI polymer chains. The reaction between the crosslinking agent and the polymer molecules preferably occurs during curing of the bearing material.

The PAI polymer chains in the bearing surface layer are crosslinked by hydrocarbon chains, which may advantageously consist of organic elements only. That is, the PAI polymer material may advantageously be crosslinked with hydrocarbon chains which consist of carbon, hydrogen, and one or more element selected from the list of: oxygen, nitrogen, sulfur, phosphorus, fluorine, chlorine, bromine, and iodine.

In a preferred embodiment, the hydrocarbon crosslinkers may consist of hydrogen and carbon only, or they may additionally comprise nitrogen and/or oxygen.

The hydrocarbon crosslinkers may consist of chains of C—C single bonds with at least two functional groups so that the chains can covalently bond to PAI molecules in two locations. The crosslinkers may alternatively contain double or triple C—C bonds.

The hydrocarbon crosslinkers may be the residues formed by a reaction of PAI material with a difunctional hydrocarbon-containing crosslinking agent having two functional groups selected from the list: amino, acid, epoxide, thiol, or isocyanate.

The hydrocarbon crosslinker attached to a PAI molecule may be a hydrocarbon chain linked to two PAI molecules via a carbonyl group, an amine group, an imide group, an amide group, an ester group, an ether group, a thioester group or an anhydride group.

The hydrocarbon crosslinkers preferably do not contain silicon.

The hydrocarbon crosslinkers are covalently bonded to the PAI polymer molecules, at one or more positions along the length of the polymer chains.

The inventor's experiments have demonstrated that this hydrocarbon-crosslinked PAI material may advantageously provide a bearing surface layer that demonstrates increased oleophilicity (affinity to oil) compared to conventional PAI materials. That is, the hydrocarbon-crosslinked PAI material may exhibit improved wettability with hydrocarbon oils typically used to lubricate vehicle bearings. Thus, the modified PAI may advantageously better retain engine oil on the bearing surface than a conventional PAI bearing material, leading to increased bearing lubricity and improved bearing-material wear characteristics particularly in stop-start applications.

The inventor has found that hydrocarbon-crosslinking of the PAI bearing material may lead to advantageously improved wettability of oil on PAI-coated bearing surfaces, with the potential effect that more oil is retained on the bearing both during running and between running operations when the bearing is stationary.

The material of the present invention may also advantageously exhibit both low friction and quicker establishment of hydrodynamic lubrication at lower speeds after start up.

Thus, the hydrocarbon-crosslinked-PAI bearing material of the present invention exhibits advantageously improved oil wettability, and highly desirable low friction characteristics.

The wear performance of hydrocarbon-crosslinked PAI surface layers was also found to be enhanced compared to a conventional PAI surface layer without added crosslinking agent.

Preferably the average chain length of the hydrocarbon crosslinkers is at least 6, or 7, or 8, or 9 carbon atoms, and/or less than or equal to 10, or 12, or 14, or 18 carbon atoms. The average chain length of the hydrocarbon groups may be between 6 and 18, or between 7 and 12, or between 8 and 10 carbon atoms.

Hydrocarbon crosslinkers with lengths in this range may advantageously form crosslinkers between PAI molecules, and in doing so impart improved hydrocarbon-characteristics to the bearing surface layer.

The length of the hydrocarbon crosslinkers is longer than typical crosslinks formed naturally during polymer curing in the absence of a crosslinking agent. This increased chain length may advantageously increase the flexibility of the crosslinked polymer network, which may contribute to improved wear behaviour in the bearing surface layer. Longer, more flexible hydrocarbon chains may improve the conformability of the cured polymer coating during engine run-in.

Preferably between 20% and 50%, or preferably between 30% and 40%, of the functionalisable sites on each polyamide-imide polymer molecule are bonded to a hydrocarbon crosslinker. This may advantageously provide an extensive crosslinking network in the polymer material, which may contribute to an improvement in wear resistance in the bearing surface layer. Having a higher ratio of crosslinking to internal imidisation will increase the number of bonds between polymer chains, which may advantageously improve the strength and cohesion of the polymer network.

Preferably, the bearing-surface layer may also comprise other materials, such as fillers within a matrix of the bearing material.

Advantageously, any such materials, including fillers, used in prior-art PAI bearing materials to enhance bearing properties such as conformability, embeddability, wear resistance, bearing-material strength and low friction may be used in the same way in bearing materials embodying the present invention.

Further features of the hydrocarbon crosslinkers and the PAI polymer may be as described above in relation to the first aspect of the invention.

In a third aspect, the invention may advantageously provide a method for making a bearing material comprising the steps of adding a difunctional crosslinking agent to a polyamide-imide polymer material, in which the crosslinking agent comprises a hydrocarbon chain and two functional groups, and in which the functional groups are selected from the list: amino, acid, epoxide, thiol, isocyanate.

The method may be a method of manufacturing a bearing material according to the first aspect of the invention. Features described in relation to the first aspect of the invention may also apply to the method of the third aspect.

The method may comprise the additional first step of preparing a polyamide-imide polymer material. This step may consist of preparing a PAI polymer according to a conventional process for forming PAI polymer material.

The difunctional crosslinking agent is a hydrocarbon with suitable reactive functionality for reaction with PAI polymer material.

The crosslinking agent is preferably added to the PAI polymer material shortly before the bearing material is to be applied to a bearing element and cured. Adding the crosslinking agent to the PAI material too long before use may undesirably allow some of the crosslinking agent molecules to react with PAI polymer chains before the bearing material has been applied to a bearing element, which may undesirably increase the viscosity of the bearing material and cause difficulties with the application process.

Preferably the difunctional crosslinking agent may be added to the polyamide-imide polymer material less than 48 hours, or less than 24, or 12, or 6, or 3 hours, or 2 hours, or one hour before the bearing material is applied to a bearing element substrate.

The crosslinking agent contains a hydrocarbon chain bonded to two functional groups selected from the list of amino, acid, epoxide, thiol, and isocyanate. For example, the crosslinking agent may be: a carboxylic acid, which contains a hydrocarbon chain attached to a —COOH (carboxyl) functional group; an amine molecule, which contains a hydrocarbon chain attached to an —NH$_2$ (amine) functional group; an epoxy reactant, which contains a hydrocarbon chain attached to an epoxide functional group, a thiol, which contains a hydrocarbon chain attached to a —SH (thiol) functional group, or an isocyanate, which contains a hydrocarbon chain attached to a —NCO (isocyanate) functional group.

The difunctional crosslinking agent molecules may comprise two different functional groups, or they may comprise two functional groups of the same type. For example, the crosslinking agent may be a diamine, a diacid, a diepoxy, a dithiol, or a diisocyanate.

The crosslinking agent may for example be a fatty diacid, that is, a carboxylic acid containing a hydrocarbon chain attached to two —COOH (carboxyl) functional groups. On curing the bearing material, the acid functional groups may react with the polymer material by condensation reaction, leaving a hydrocarbon chain, attached to oxygen and/or nitrogen functional groups, including via the formation of an amide, covalently bonded to two polymer chains so that the hydrocarbon chain forms a crosslinker.

In preferred embodiments, the crosslinking agent may be sebacic acid ($C_{10}H_{18}O_4$) or suberic acid ($C_8H_{14}O_4$).

The crosslinking agent may be a fatty diamine, that is, an amine containing a hydrocarbon chain attached to two —NH$_2$ (amine) functional groups. On curing the bearing material, the amine functional groups may react with the polymer material by condensation reaction, leaving a hydrocarbon chain, attached to oxygen and/or nitrogen functional groups, including via the formation of an amide, covalently bonded to two polymer chains so that the hydrocarbon chain forms a crosslinker.

The hydrocarbon-containing reactant may be a hydrocarbon with two epoxide, thiol or isocyanate functional groups attached to the hydrocarbon chain. On curing the bearing material, the epoxide, thiol or isocyanate functional groups may react with an acid group, or an amine group, on the polymer material. This may leave a hydrocarbon chain, attached to oxygen and/or nitrogen and/or sulphur functional groups, including via the formation of an ester, amide, anhydride or thioester covalently bonded to two polymer chains so that the hydrocarbon chain forms a crosslinker.

Preferably the average chain length of the hydrocarbon chain in the crosslinking agent is between 6 and 18 carbon atoms, preferably between 7 and 12, particularly preferably between 8 and 10 carbon atoms.

The crosslinking agent may be chosen in order to result in crosslinking with hydrocarbon chains of a desired chain length, and with desired properties. That is, the crosslinking agent may contain saturated or unsaturated hydrocarbon chains, so as to form saturated or unsaturated hydrocarbon crosslinkers. Likewise, the crosslinking agent may contain alkyl groups containing only single carbon-carbon bonds, alkenyl groups containing one or more double bonds between carbon atoms, or alkynyl groups containing one or more triple bonds between carbon atoms.

Preferably, the crosslinking agent may contain aliphatic hydrocarbon chains, particularly preferably the hydrocarbon chains may be unbranched hydrocarbon chains.

Preferably the crosslinking agent is added to the reaction mixture in a quantity such that the molar ratio of the crosslinking agent to the functionalisable sites on the polymer chains of the polymer material is between 0.1 and 0.25, and preferably between 0.15 and 0.2.

The molar ratio of the hydrocarbon-containing reactant to functionalisable reaction sites in the polymer material may be calculated as described above in relation to the first aspect of the invention, and may advantageously determine the average number of crosslinking agent molecules which will bond to each polymer chain. As the molar ratio of crosslinking agent to functionalisable reaction sites in the polymer material increases, the number of crosslinkers per polymer molecule will on average increase. The higher the ratio, the greater the proportion of functionalisable sites, or reaction sites, on the PAI chains which will become occupied by hydrocarbon crosslinkers on curing.

In a fourth aspect, the invention may advantageously provide a method for manufacturing a bearing element, comprising the step of applying the bearing material of the first aspect to a bearing element substrate, and curing the bearing material so that the difunctional crosslinking agent reacts to form hydrocarbon crosslinkers between polyamide-imide polymer molecules.

The method may comprise the step of the first step of forming the bearing material by adding the difunctional crosslinking agent to the polyamide-imide polymer material less than 48 hours, or less than 24, or 12, or 6, or 3 hours before the bearing material is applied to the bearing element substrate.

Adding the crosslinking agent to the polymer material shortly before applying the bearing material to the bearing element substrate means that the crosslinking agent does not have time to react significantly with the polymer molecules before the bearing material is applied. A preferred method of applying the bearing material to a bearing element is spraying, so it is desirable to avoid a premature crosslinking reaction which could increase viscosity of the bearing material and create difficulties with spraying.

The method for manufacturing a bearing element may comprise the steps of making a bearing material according to the third aspect of the invention, followed by the steps of applying the bearing material to a bearing element substrate, and curing the bearing material so that the difunctional crosslinking agent reacts to form hydrocarbon crosslinkers between polyamide-imide polymer molecules.

During curing, the crosslinking agent advantageously reacts to deposit the hydrocarbon chains of the crosslinkers between two of the reactive, or functional, sites on the polymer chains.

Thus the hydrocarbon crosslinkers bonded to the PAI material may be the residues obtained from the reaction between the difunctional crosslinking agent and the PAI material.

The bearing material may be applied to the bearing element and cured to form a bearing surface layer.

The bearing material may be cured by conventional polymer curing techniques, for example by applying heat to the bearing material. Curing may advantageously accelerate the reactions between the crosslinking agent and the PAI polymer material, so that the crosslinking agent reacts to form hydrocarbon-chain crosslinkers between polymer chains.

The method of manufacturing a bearing element may advantageously provide a bearing element as described above in relation to the second aspect of the invention.

The bearing material and the crosslinking agent, including preferred chain lengths and molar ratios, is preferably as described above in relation to the first, second and/or third aspects of the invention.

BRIEF DESCRIPTION OF THE DRAWINGS

Specific embodiments of the invention will now be described by way of example, with reference to the accompanying drawings, in which.

DETAILED DESCRIPTION

Figure 1:
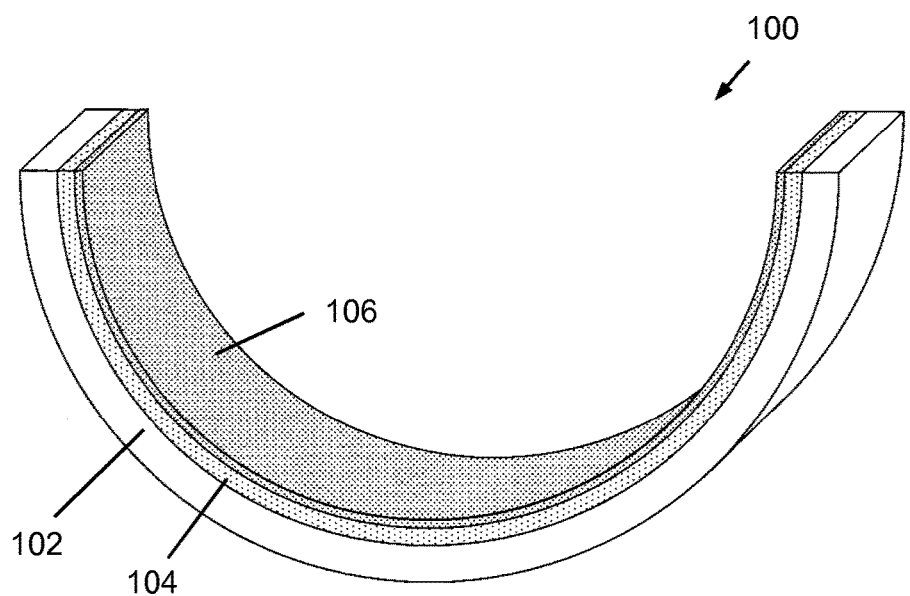
FIG. 1 is a schematic diagram of a half-shell of a plain bearing.

FIG. 1 shows a half shell 100 of a cylindrical sliding bearing comprising a strong backing 102 of steel, a bearing lining layer 104, comprising a layer of a copper-based alloy or an aluminium-based alloy bonded to the backing and a nickel diffusion barrier, or interlayer, and a plastics, polymer-based overlay layer 106 embodying an aspect of the present invention bonded to the lining layer. In other embodiments of the invention the overlay may be bonded directly to the backing, and the lining layer omitted, depending on the compatibility of the materials used and the intended use of the bearing.

The uppermost surface of the polymer overlay 106 provides a running surface (i.e. a sliding surface) of the bearing shell 100. In use, within an assembled bearing, the polymer overlay 106 faces a rotating bearing journal with which the bearing shell 100 mutually cooperates, with an intervening film of lubrication oil. The overlay layer 106 is the bearing surface layer.

The overlay layer 106 comprises a hydrocarbon-crosslinked PAI resin matrix embodying an aspect of the invention and fabricated as described below. The PAI matrix may incorporate filler materials as follows.

As in prior-art polymer bearings, the polymer overlay material may optionally include or incorporate at least one solid lubricant. Suitable solid lubricants include: metal sulphides with layered structures; graphite; hexagonal boron nitride (h-BN); molybdenum disulfide ($MoS_2$); tungsten disulphide ($WS_2$), melamine cyanurate or PTFE. One or more of these materials may be used in an overlay layer. Other suitable materials are envisaged and will be readily apparent to the skilled person.

As in prior-art polymer bearings, the sliding layer material may also include harder particles in powdered and/or flaked form. This may provide improved wear resistance. The harder particles may include, in any suitable combination, one or more different types of hard particle. Some suitable hard particles include nitrides, carbides, borides, oxides, and metal powders. Other suitable materials are envisaged and will be readily apparent to the skilled person.

The total thickness of the sliding layer material is between about 3 μm, or 6 μm, and about 14 μM. A preferred thickness of the sliding layer material for bearing elements embodying the present invention is between about 6 μm and about 12 μm, or particularly preferably in the range 8 μm to 11 μm.

A conventional PAI polymer for a bearing material is formed by the copolymerisation of polyamide imide monomers such as trimellitic anhydride and methylene diamine. These monomers are mixed in known manner, in combination with suitable solvents and catalytic materials, to allow the monomers to copolymerise. An initial polymerisation step produces a polymer which may be applied to the surface of a bearing substrate, for example by spraying, and cured to form a thermoset PAI bearing layer. This process is described in the prior art, such as in patent publications WO 2004/113749 and GB 2521004A. No crosslinking agent is added to conventional PAI bearing materials such as that described in WO 2004/113749 and GB 2521004A.

Synthesis Method

In a preferred embodiment of the present invention, this prior art process is modified by adding a crosslinking agent to liquid PAI bearing material containing the PAI polymer and additives in a solvent. The crosslinking agent is mixed into the bearing material so that it dissolves in the solvent.

The crosslinking agent is a difunctional hydrocarbon-based reactant, in which hydrocarbon chains are each attached to two functional groups. The two functional groups are selected from the list of: amino, acid, epoxide, thiol, and isocyanate.

The crosslinking agent is added to the PAI bearing material shortly (preferably less than one hour) before the bearing material is to be applied to a bearing substrate. Adding the crosslinking agent to the bearing material less than one hour before the material is applied to the bearing substrate helps to minimise reactions between the crosslinking agent and the polymer material before application to the bearing substrate.

The crosslinking agent is preferably added to the bearing material together with a separate silane-based adhesion promoting agent.

The resulting bearing material is a liquid comprising PAI polymer. The bearing material may be applied to the surface of a bearing element, for example by spraying the liquid bearing material onto the surface of a bearing substrate (an uncoated bearing half shell).

Once applied to the bearing element, the bearing material is cured to form a thermoset PAI bearing layer. Conventional curing processes may be used. Curing hardens the polymer material and causes crosslinking of the polymer chains.

During curing, the hydrocarbon-based crosslinking agent reacts with functionalisable sites on the polymer chains so that the functional groups of the crosslinking agent react and bond covalently to the polymer chains at a proportion of the available reaction sites. Due to steric considerations the two functional groups of the crosslinking agent molecules tend to react with functionalisable sites on different polymer chains, so that the hydrocarbon chains of the crosslinking agent attach as crosslinkers linking two polymer molecules.

The quantities of reactant are controlled so that the addition of the crosslinking agent causes the polymer chains to become crosslinked at a desired proportion of the potential reaction sites on the polymer chains.

Preferred Embodiments

Preferred embodiments of cured PAI bearing material contain the following components:

| | |
|---|---|
| Aluminium Flakes | 24-28 wt % |
| Solid lubricant (PTFE) | 8-12 wt % |
| Adhesion Agent (silane) | 3-5 wt % |
| Leveller | <0.5 wt % |
| PAI polymer resin functionalised with hydrocarbon crosslinkers | Remainder, up to total of 100 wt % |

Differential Scanning calorimetry Testing

In order to compare the effects of different quantities of crosslinking agent on the cured polymer overlay, samples of PAI modified with various proportions (mol %) of hydrocarbon crosslinkers were prepared and cured according to the synthesis route set out above. The DSC samples contained no further additives.

The crosslinking agent selected for DSC samples was 1,8-diaminooctane, which consists of a hydrocarbon chain of 8 carbon atoms, with amino functional groups bonded to the terminal carbon atoms on both ends of the chain.

A sample with 10% crosslinking was prepared by adding 1,8-diaminooctane crosslinking agent to PAI polymer material in a ratio of 0.05 crosslinking agent molecules:functionalisable sites on an average PAI molecule. Thus, after curing, the two functional groups of the crosslinking agent would be expected to bond to 10% of the functionalisable sites of the polymer molecules.

A sample with 20% crosslinking was prepared by adding 1,8-diaminooctane crosslinking agent to PAI polymer material in a ratio of 0.1 crosslinking agent molecules:functionalisable sites on an average PAI molecule. Thus, after curing, the two functional groups of the crosslinking agent would be expected to bond to 20% of the functionalisable sites of the polymer molecules.

A sample with 33% crosslinking was prepared by adding 1,8-diaminooctane crosslinking agent to PAI polymer material in a ratio of 0.165 crosslinking agent:functionalisable sites on an average PAI molecule. Thus, after curing, the two functional groups of the crosslinking agent would be expected to bond to 33% of the functionalisable sites of the polymer molecules.

A sample with 0% hydrocarbon-crosslinking was prepared from the same base PAI material with no crosslinking agent added.

These four samples were prepared and cured. The samples where then analysed by differential scanning calorimetry (DSC).

The functional groups of the hydrocarbon-based crosslinking agent molecules are thought to react with functionalisable sites on the PAI polymer molecules so that the hydrocarbon chain becomes bonded to PAI molecules at both ends. Thus, as 1,8-diaminooctane is used as the crosslinking agent, it is thought that, on average, the PAI chains become crosslinked by hydrocarbon chains with a length of eight carbon atoms.

Figure 2:
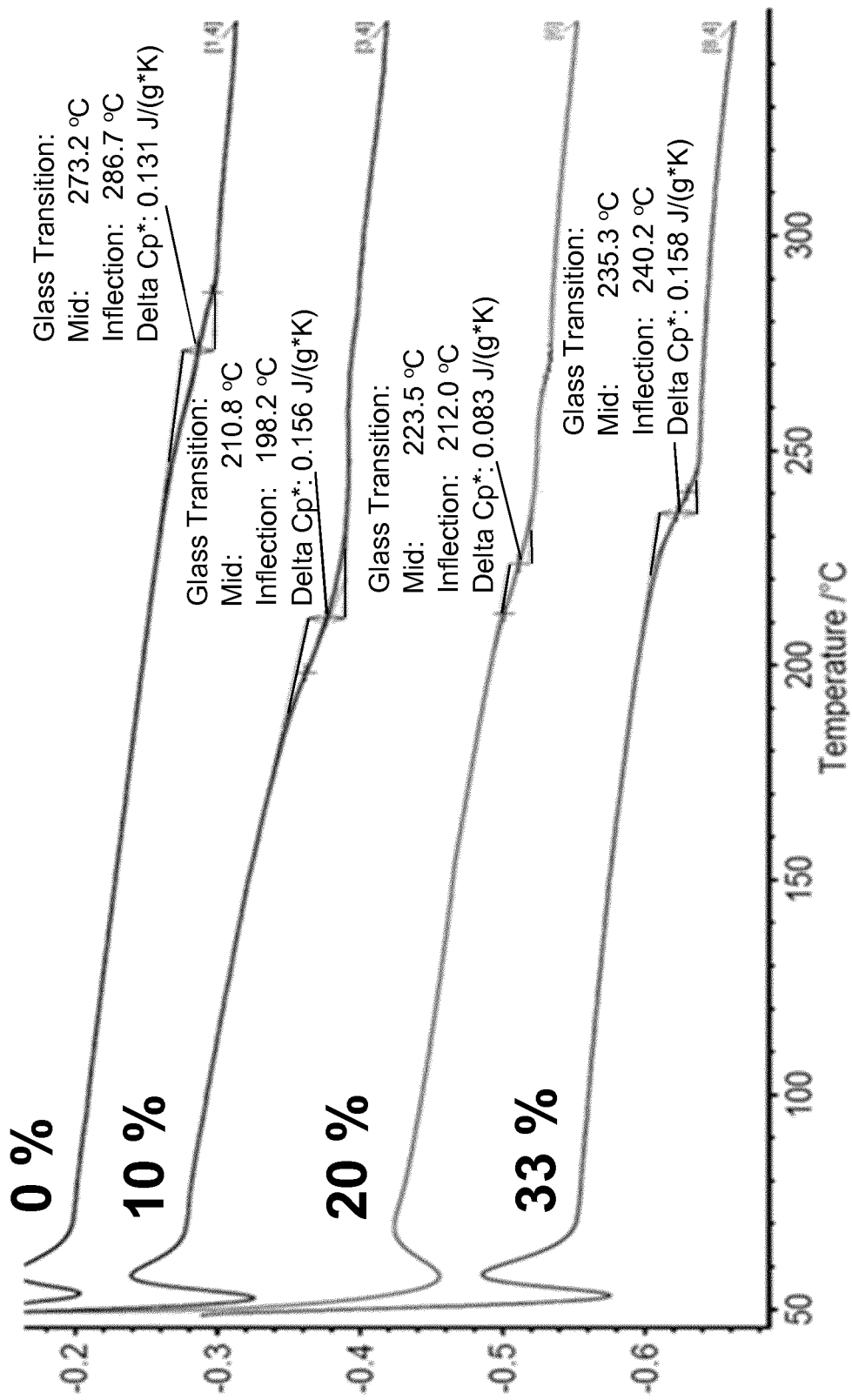
FIG. 2 shows the results of differential scanning calorimetry (DSC) measurements on several bearing materials.

As shown in FIG. 2, the addition of crosslinking agent to the bearing material before curing causes a change in the glass transition temperature ($T_g$) of the cured material.

In conventional PAI bearing material, the curing process causes cross-links to form between polymer molecules, even though no separate crosslinking agent has been added. These "naturally-occurring" cross-links are formed between functional groups on polymer chains, and are therefore typically fairly short and inflexible.

The change in glass transition temp (Tg) on addition of crosslinking agent shows that the functionalization of the PAI polymer chains has occurred.

Surprisingly, the addition of a small amount of crosslinking agent to the 10% crosslinked sample was found to cause the greatest decrease in the $T_g$ relative to the 0% bearing material, while larger amounts of crosslinking agent result in the $T_g$ increasing back towards the 0% level.

The inventor considers that the large decrease in $T_g$ between 0% and 10% hydrocarbon-crosslinked samples is potentially attributable to the crosslinking becoming more flexible as "naturally-occurring" short cross-links are replaced by longer hydrocarbon crosslinkers.

As the % crosslinking of the polymer is increased by adding more crosslinking agent, fewer unfunctionalised (un-crosslinked) polymer chains remain in the bearing material. Dual functionalization (hydrocarbon chains becoming bonded to polymer chains at both ends) becomes prevalent over monofunctionalisation, and more crosslinking agent is successfully incorporated to form crosslinkers, so the polymer network becomes more extensively crosslinked. This may add rigidity to the overall polymer network, despite the flexibility of individual hydrocarbon chain crosslinkers, so the $T_g$ of the cured material increases with increasing % crosslinking.

All samples were found to have a $T_g$ high enough for use as a bearing overlay, where high running temperatures mean that a $T_g$ higher than 200 degrees centigrade is desirable.

FTIR Testing

The inventor has conducted a study into how else the thermal properties of the polymer or the overall polymer structure might be changing with increasing proportions of crosslinking agent, by analysing differences in the chemical makeup post-cure for samples with different % crosslinking.

Table 1, below, shows 'integration' values for the amide peaks for the polymer samples. These integration values are achieved by FT-IR analysis of the polymer samples after curing, specifically looking at the amide peak at approximately 1650 $cm^{-1}$ wavenumbers.

The imide peak for the polymer is at 1700 $cm^{-1}$ wavenumbers.

In conventional PAI polymer overlay with no additional crosslinking agent, the majority of reaction on curing is expected to be internal imidization with a smaller amount of the polymer functional groups forming crosslinks.

A higher value for the amide peak after curing means that less of the polymer has gone through this imidization, and more of the polymer's functional groups are likely to have crosslinked.

With the addition of a higher % of crosslinking agent there is less internal imidization on the polymer chain occurring within the polymer, and the integration of the amide peaks show that more of the polymer's functional groups are reacting to create crosslinking between polymer chains. The inventor considers that this could suggest that higher proportions of hydrocarbon-crosslinking may lead to a more robust polymer overlay, as there are more crosslinkers to bind across the whole polymer network.

TABLE 1

FT-IR Peak Integration Results

| Sample | No Crosslinker | 20% hydrocarbon-crosslinked | 50% hydrocarbon-crosslinked |
|---|---|---|---|
| Cured Integration | 1.20 | 1.6 | 1.75 |

Contact Angle Testing

Contact angle analysis confirmed that oil wettability (oleophilicity) increased by adding hydrocarbon crosslinkers to the PAI material.

Contact angle measurements conducted with motor oil on 0% hydrocarbon-crosslinked PAI (0% crosslinking agent added) and 50% crosslinked PAI are set out in Table 2, below.

A first sample was prepared using 1,8-diaminooctane as crosslinking agent. In order to obtain 50% crosslinking, crosslinking agent was added in a proportion of 0.25 crosslinking agent molecules:functionalisable sites on an average PAI molecule. Thus, after curing, the two functional groups of the crosslinking agent would be expected to bond to 50% of the functionalisable sites of the polymer molecules. As the two terminal carbon atoms of the octane chains are functionalised in the crosslinking agent, reaction of the functional groups with PAI molecules is expected to result in 50% of the functionalisable sites on the PAI molecules being crosslinked by hydrocarbon chains of eight carbon atoms.

A second sample was prepared using 1,10-diaminodecane as crosslinking agent. In order to obtain 50% crosslinking, crosslinking agent was added in a proportion of 0.25 crosslinking agent molecules:functionalisable sites on an average PAI molecule. As the two terminal carbon atoms of the decane chains are functionalised in the crosslinking agent, reaction of the functional groups with PAI molecules is expected to result in 50% of the functionalisable sites on the PAI molecules being crosslinked by hydrocarbon chains of ten carbon atoms.

TABLE 2

Contact Angle Results

| Crosslinking agent | 0% crosslinked | 50% crosslinked |
|---|---|---|
| 1,8 diaminooctane | 49.0 | 43.4 |
| 1,10 diaminodecane | 49.0 | 42.8 |

As shown in Table 2, contact angle testing showed that 50% octane-crosslinked PAI exhibited a similar contact angle to 50% decane-crosslinked PAI.

A lower contact angle demonstrated improved oil-wetting, and is desirable for bearing surface layers.

Both hydrocarbon-crosslinked samples exhibited significantly improved contact angles compared to non-hydrocarbon-crosslinked samples. This supports the inventor's theory that the introduction of hydrocarbon chains into the polymer material as crosslinkers advantageously provides the cured polymer material with more oleophilic properties.

Wear Testing

Figure 3:
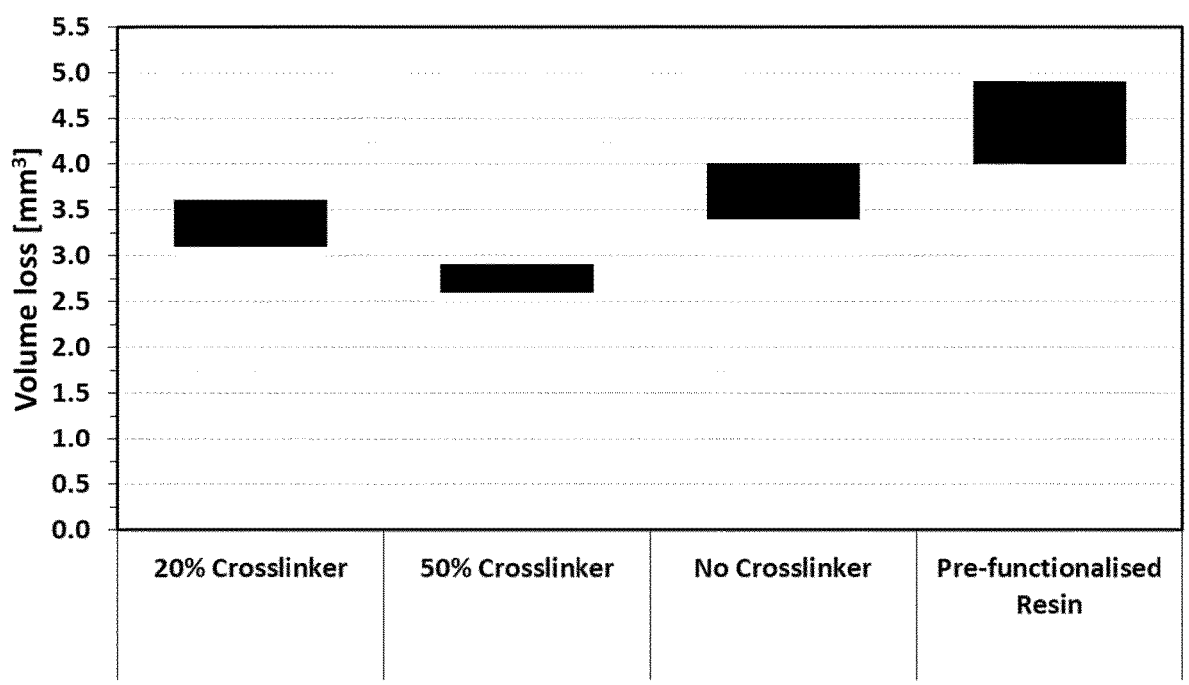
FIG. 3 shows the results of VIPER wear tests on four bearing elements with bearing surface layers formed from different bearing materials.

FIG. 3 shows the results of wear testing of four samples of cured PAI polymer material.

In order to compare the wear resistance of PAI overlays containing different quantities of crosslinking agent, samples of PAI modified with various proportions (mol %) of hydrocarbon crosslinkers, sprayed onto bearing shells, and cured according to the synthesis route set out above.

A 20% hydrocarbon-crosslinked sample, a 50% hydrocarbon-crosslinked sample, and a 0% hydrocarbon-crosslinked sample were used for wear testing.

A fourth sample was also prepared according to the method described in UK patent application no. 1706834.7, which was filed on 28 Apr. 2017 and is unpublished as of the filing date of the present application. The invention set out in GB1706834.7 has not been made public by public use or otherwise as of the filing date of the present application.

According to the method of GB1706834.7, a hydrocarbon-functionalised PAI bearing material was prepared by performing the prior art copolymerisation process as usual to produce conventional PAI polymer. The conventional PAI was heated under nitrogen together with a solvent and a catalyst, so that the PAI is dissolved in the solvent. A hydrocarbyl-containing reactant of 1-dodecylamine was then added dropwise to the reaction mixture.

The resulting polymer may be applied to the surface of a bearing element and cured to form a thermoset PAI bearing layer. The resulting resin comprises polymer chains functionalised with dodecyl hydrocarbon groups.

Unlike the present invention, the bearing material of GB1706834.7 uses monofunctionalised hydrocarbyl-containing reactants, so the hydrocarbon functional groups do not form crosslinkers between polymer molecules.

As the method of GB1706834.7 causes the PAI to be functionalised before application to a bearing element, and before curing, the bearing material may be termed "pre-functionalised resin" (as shown in FIG. 3). This differs from the material of the present invention, which is functionalised with crosslinking agent after application to the bearing element, and during curing.

As shown in FIG. 3, both the 20% and 50% hydrocarbon-crosslinked samples exhibited better wear behaviour (measured by volume loss in $mm^3$) than the conventional PAI sample with 0% hydrocarbon-crosslinking.

The hydrocarbon-crosslinking invention of the present application may thus advantageously provide improved oleophilicity and wear resistance compared to conventional PAI bearing materials.

The 20% and 50% hydrocarbon-crosslinked samples also exhibited significantly improved wear behaviour compared to the dodecyl-functionalised PAI sample prepared by the method of GB1706834.7. This may be attributable to the hydrocarbon crosslinkers improving the strength and resilience of the polymer matrix.

The hydrocarbon-crosslinking invention of the present application may thus advantageously provide improved wear resistance compared to the hydrocarbon-functionalised PAI of GB1706834.7 (as yet unpublished).

The invention claimed is:

1. A bearing material comprising:
   a polyamide-imide polymer material; and
   a difunctional crosslinking agent comprising a hydrocarbon chain and two functional groups;
   wherein the functional groups are selected from the list: amino, acid, epoxide, thiol, isocyanate; and
   the average chain length of the hydrocarbon chains is between 6 and 18.

2. The bearing material according to claim 1, wherein the difunctional crosslinking agent is a diamine, a diacid, a diepoxy, a dithiol, or a diisocyanate.

3. The bearing material according to claim 1, wherein a first one of the functional groups of the crosslinking agent is an amino functional group, and a second one of the functional groups of the crosslinking agent is selected from the list: amino, acid, epoxide, thiol, isocyanate.

4. The bearing material according to claim 1, wherein more than 90% of the hydrocarbon chains of the difunctional crosslinking agent are aliphatic hydrocarbon chains.

5. The bearing material according to claim 1, wherein more than 90% of the hydrocarbon chains of the difunctional crosslinking agent are unbranched hydrocarbon chains.

6. The bearing material according to claim 1, wherein a molar ratio of the crosslinking agent to functionalisable sites in each molecule of the polymer material is between 0.1 and 0.25.

7. A bearing element comprising:
a bearing surface layer including a polyamide-imide polymer material with hydrocarbon crosslinkers between polymer molecules;
wherein the hydrocarbon crosslinkers have an average chain length of between 6 and 18 carbon atoms.

8. The bearing element according to claim 7, wherein between 20% and 50% of the functionalisable sites on each polyamide-imide polymer molecule are bonded to a hydrocarbon crosslinker.

9. A method for making a bearing material, comprising:
adding a difunctional crosslinking agent to a polyamide-imide polymer material;
wherein the crosslinking agent includes a hydrocarbon chain and two functional groups, and the functional groups are selected from the list: amino, acid, epoxide, thiol, isocyanate; and
the difunctional crosslinking agent is added in a quantity such that a molar ratio of the difunctional crosslinking agent to functionalisable sites in each molecule of the polymer material is between 0.1 and 0.25.

10. The method for making a bearing material according to claim 9, wherein the difunctional crosslinking agent is a diamine, a diacid, a diepoxy, a dithiol, or a diisocyanate.

11. A method for manufacturing a bearing element, comprising
applying a bearing material to a bearing element substrate, the bearing element including a polyamide-imide polymer material and a difunctional crosslinking agent comprising a hydrocarbon chain and two functional groups, the functional groups selected from the list: amino, acid, epoxide, thiol, isocyanate, and the average chain length of the hydrocarbon chains is between 6 and 18; and
curing the bearing material so that the difunctional crosslinking agent reacts to form hydrocarbon crosslinkers between polyamide-imide polymer molecules.

12. The method for manufacturing a bearing element according to claim 11, further comprising forming the bearing material by adding the difunctional crosslinking agent to the polyamide-imide polymer material less than 48 hours, before the bearing material is applied to the bearing element substrate.

13. The bearing material according to claim 6, wherein the molar ratio is between 0.15 and 0.2.

14. The bearing element according to claim 7, wherein the average chain length is between 7 and 12 carbon atoms.

15. The bearing element according to claim 14, wherein the average chain length is between 8 and 10 carbon atoms.

16. The bearing element according to claim 8, wherein between 30% and 40% of the functionalisable sites on each polyamide-imide polymer molecule are bonded to the hydrocarbon crosslinker.

17. The method for making a bearing material according to claim 9, wherein the molar ratio 0.15 and 0.2.

\* \* \* \* \*